United States Patent
Vindspoll et al.

(10) Patent No.: US 9,856,421 B2
(45) Date of Patent: Jan. 2, 2018

(54) PROCESS FOR UPGRADING A HEAVY HYDROCARBON FEEDSTOCK

(71) Applicant: STATOIL PETROLEUM AS, Stavanger (NO)

(72) Inventors: Harald Vindspoll, Trondheim (NO); Knut Vebjørn Grande, Trondheim (NO); Carsten Frithjof Sørlie, Trondheim (NO); Marianne Haugan, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 50 days.

(21) Appl. No.: 14/370,407

(22) PCT Filed: Jan. 3, 2013

(86) PCT No.: PCT/EP2013/050045
§ 371 (c)(1),
(2) Date: Jul. 2, 2014

(87) PCT Pub. No.: WO2013/102639
PCT Pub. Date: Jul. 11, 2013

(65) Prior Publication Data
US 2014/0367309 A1    Dec. 18, 2014

(30) Foreign Application Priority Data
Jan. 6, 2012    (GB) .................................... 1200155.8

(51) Int. Cl.
*C10G 9/00*    (2006.01)
*C10G 7/00*    (2006.01)
(Continued)

(52) U.S. Cl.
CPC ............... *C10G 7/00* (2013.01); *C10G 9/005* (2013.01); *C10G 9/007* (2013.01); *C10G 45/00* (2013.01);
(Continued)

(58) Field of Classification Search
CPC .... C10G 47/00; C10G 2300/308; C10G 9/00; C10G 9/007
See application file for complete search history.

(56) References Cited

U.S. PATENT DOCUMENTS 3,523,071 A    8/1970    Knapp et al.
4,027,688 A    6/1977    Gruber et al.
(Continued)

FOREIGN PATENT DOCUMENTS

FR    2 480 300 A1    10/1981
SU    1122866 A    11/1984
(Continued)

OTHER PUBLICATIONS

English Translation of SU 1122866 obtained from Proquest.*
(Continued)

*Primary Examiner* — Michelle Stein
(74) *Attorney, Agent, or Firm* — Birch, Stewart, Kolasch & Birch, LLP

(57) ABSTRACT

The present invention provides a process for upgrading a heavy hydrocarbon mixture, said process comprising: i) dividing said heavy hydrocarbon mixture into at least a first portion and a second portion, wherein said first portion comprises 10-45% wt of the heavy hydrocarbon mixture and said second portion comprises 90-55% wt of the heavy hydrocarbon mixture; ii) thermally upgrading said first portion of heavy hydrocarbon mixture in an upgrader to produce a lighter hydrocarbon mixture; and iii) mixing said lighter hydrocarbon mixture with a heavy hydrocarbon
(Continued)

mixture to produce an upgraded hydrocarbon mixture, wherein, on entry to said upgrader, the composition of said first portion of heavy hydrocarbon mixture is identical to that of said second portion of heavy hydrocarbon mixture.

14 Claims, 1 Drawing Sheet

(51) Int. Cl.
*C10G 45/00* (2006.01)
*C10G 47/00* (2006.01)
*C10G 49/00* (2006.01)

(52) U.S. Cl.
CPC ............. *C10G 47/00* (2013.01); *C10G 49/00* (2013.01); *Y02E 60/34* (2013.01)

(56) References Cited

U.S. PATENT DOCUMENTS

| | | | |
|---|---|---|---|
| 4,092,238 A * | 5/1978 | Iona .................. | C10G 47/00 208/80 |
| 4,172,026 A * | 10/1979 | Jensen ............... | C10G 31/06 208/14 |
| 4,391,701 A | 7/1983 | Le Page et al. | |
| 5,069,775 A * | 12/1991 | Grosboll ............. | C10G 49/007 208/107 |
| 5,097,903 A | 3/1992 | Wilensky | |
| 6,357,526 B1 | 3/2002 | Abdel-Halim et al. | |
| 6,357,626 B1 | 3/2002 | Abdel-Halim et al. | |
| 6,485,631 B1 | 11/2002 | Ellingsen | |
| 2005/0121366 A1 | 6/2005 | Manson | |
| 2007/0034550 A1 * | 2/2007 | Hedrick ............... | C10G 11/00 208/113 |
| 2007/0108098 A1 | 5/2007 | Flint et al. | |
| 2011/0259791 A1 * | 10/2011 | Mesters .............. | C10G 29/02 208/14 |

FOREIGN PATENT DOCUMENTS

| | | |
|---|---|---|
| WO | WO 98/10036 A1 | 3/1998 |
| WO | 00/47695 A1 | 8/2000 |
| WO | WO 00/47695 A1 | 8/2000 |
| WO | WO 02/086024 A1 | 10/2002 |
| WO | WO 2005/003258 A1 | 1/2005 |
| WO | WO 2005/003268 A1 | 1/2005 |
| WO | WO 2005/078051 A1 | 8/2005 |
| WO | WO 2007/133089 A1 | 11/2007 |
| WO | WO 2010/069907 A1 | 6/2010 |
| WO | WO 2010/080039 A1 | 7/2010 |

OTHER PUBLICATIONS

International Search Report issued in PCT/EP2013/050045, dated Apr. 17, 2013.
Search Report issued in Great Britain Application No. GB1200155.8, dated May 2, 2012.
Written Opinion of the International Searching Authority issued in PCT/EP2013/050045, dated Apr. 17, 2013.

* cited by examiner

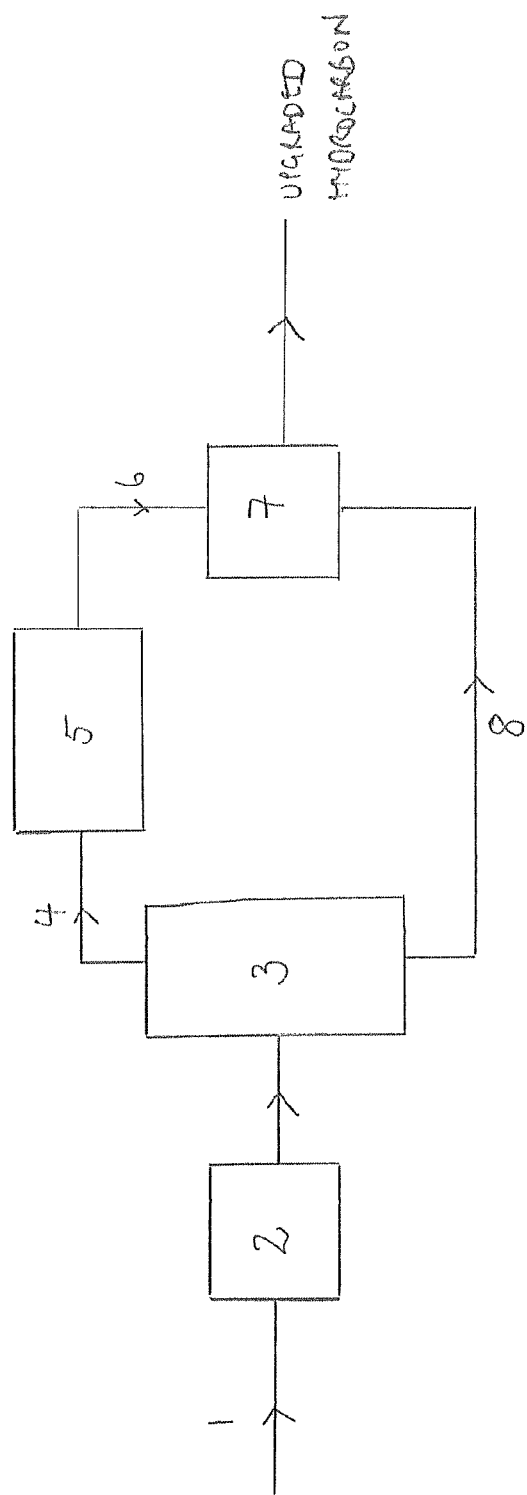

PROCESS FOR UPGRADING A HEAVY HYDROCARBON FEEDSTOCK

The present invention relates to a process for upgrading a heavy hydrocarbon mixture to improve its transportability and to an upgraded hydrocarbon mixture per se. The invention is also concerned with a method of transporting a heavy hydrocarbon mixture, typically to a refinery.

BACKGROUND

Heavy hydrocarbons, e.g. bitumen, represent a huge natural source of the world's total potential reserves of oil. Present estimates place the quantity of heavy hydrocarbon reserves at several trillion barrels, more than 5 times the known amount of the conventional, i.e. non-heavy, hydrocarbon reserves. This is partly because heavy hydrocarbons are generally difficult to recover by conventional recovery processes and thus have not been exploited to the same extent as non-heavy hydrocarbons. Heavy hydrocarbons possess very high viscosities and low API (America) Petroleum Institute) gravities which makes them difficult, if not impossible, to pump in their native state. Additionally heavy hydrocarbons are characterised by high levels of unwanted compounds such as asphaltenes, trace metals and sulphur that need to be processed appropriately during recovery and/or refining.

Heavy hydrocarbon mixtures are challenging to transport from wells to refineries because they have very high viscosities making them difficult, and in some cases impossible, to pump. Pumping of high viscosity fluids is also expensive. Generally therefore the flowability of heavy hydrocarbon mixtures obtained from heavy hydrocarbon reservoirs needs to be improved through partial or full upgrading before transportation by pipeline or ship to a conventional refinery.

The transportability of viscous heavy hydrocarbon mixtures is conventionally improved by dilution with a lighter hydrocarbon such as naphtha, a very light crude oil or a condensate. The dilution of the heavy hydrocarbon with the diluent typically reduces its overall to API to about 20 degrees enabling it to be pumped to a refinery.

There are, however, disadvantages to the use of a diluent in this way. These include:

The need to transport diluent on-site. This problem becomes particularly acute for off-shore well sites.
The need to identify a compatible diluent for each heavy hydrocarbon mixture, e.g. one that does not cause precipitation of asphaltenes
The need to separate the diluent and the hydrocarbon mixture at the refinery prior to processing
Down stream processing/cleaning of the diluent prior to its reuse or disposal. Often it is preferable to return it to the well site (i.e. to recycle it) although this again requires it to be pumped a significant distance.

Another approach that has previously been adopted is to upgrade heavy hydrocarbon mixtures on site prior to transportation to a refinery. Thus a heavy hydrocarbon mixture recovered from a well may be upgraded to form lighter oil having an API of about 20-35 degrees on site and then pumped to a refinery. In such a set up, the upgrading is typically carried out by thermal cracking and/or hydrocracking.

Again, however, there are disadvantages to such a process. These include:

The need to transport significant amounts of fuel and/or hydrogen for use in the upgrading processes to the well site.

The high level of contaminants in heavy hydrocarbon oils leads to catalytic poisoning as well as to the production of environmental pollutants.

Moreover in order for full upgrading to be carried out economically on site, vast volumes of heavy hydrocarbon mixture need to be processed daily in order that the economies of scale make it feasible. Few well sites, however, produce sufficiently high volumes of heavy hydrocarbon mixture. This problem does not arise at conventional refineries that receive heavy hydrocarbon mixture from a number of different well sites.

Alternatively, a recovered heavy hydrocarbon mixture may be partially refined or upgraded on-site, e.g. using a processing plant located close to the production well. WO2005/003258, for example, discloses a process wherein part of a bitumen feed is upgraded and used to convert the overall feed into a pipeline-transportable crude oil. The process involves the following steps:

1. Separation of a bitumen feed into two parts, a first part and a second part.
2. Separation of the first part into light and heavy fractions, preferably by distillation.
3. Thermally cracking, e.g. by visbreaker soaking, the heavy fraction into a second light fraction and a residual fraction and fractionating said fractions.
4. Mixing the second part and the two light fractions to form a transportable hydrocarbon.
5. Using the residual fraction from thermal cracking for energy generation.

The process of WO2005/003258 is therefore relatively complex involving several energy intensive steps, e.g. distillation, thermal cracking and fractionation. This is undesirable, especially in a relatively remote location, e.g. off-shore. Moreover a residual fraction of the bitumen feed is not incorporated into the pipeline-transportable crude oil and thus represents a loss in process yield.

A similar process is also disclosed in US2007/0108098. In this process a heavy hydrocarbon feedstock is separated into a residue component and a lighter component, e.g. by distillation, and then the lighter component is treated to produce a synthetic diluent that is combined with the residue component to make it transportable. Various different methods are disclosed for treating the lighter component including hydrocracking, hydrotreating, thermal conversion and catalytic cracking.

Like the process of WO2005/003258, however, the method of US2007/0108098 is quite complex and involves an initial separation step, such as a distillation, to produce a lighter fraction from which a diluent is subsequently produced. US2007/0108098 also suggests that the diluent may not necessarily be added to all of the residue component and that instead some of the latter may be diverted for use as a fuel. Again this represents a reduction in the process yield.

WO98/10036 describes an alternative process wherein a part of a heavy oil is separated out and is degraded to a more liquid substance which is then mixed with the remaining heavy oil. The process described in WO98/10036 does not involve an initial separation of the heavy hydrocarbon mixture into lighter and heavier fractions as in WO2005/003258 and US2007/0108098, but it does involve modifying the composition of the part of the heavy oil that is to be upgraded. Thus in the method disclosed in WO98/10036 the separated heavy oil is mixed with solid particles, typically sand, and the mixture upgraded by cracking in a hammer mill type of apparatus. Water is also preferably added prior to carrying out the cracking. In the cracking process the heat required is supplied at least partially by the effect of the hammers of the mill (i.e. mechanically). After the cracking reaction is complete, the crude reaction mixture undergoes a separation process to remove as much of the solid particles and water as possible before the cracked, lighter hydrocarbon is mixed with the remaining heavy oil.

The process of WO98/10036 therefore requires a significant number of steps in addition to the actual cracking process to produce an upgraded hydrocarbon for mixing with the remaining heavy oil. Methods and equipment are required for adding solid particles to the heavy oil, e.g. in the cracker apparatus, as well as for removing them from the upgraded product. Additionally to make the process economically more attractive, the solid particles, e.g. sand, needs to be cleaned to remove the hydrocarbon stuck to its surface so it can be recycled in the process. WO98/10036 also teaches that the presence of water stabilises the hammer mill cracking process and hence water should be added to the separated part of the heavy oil prior to processing. The use of 1-20% by weight water is advocated. This increases the volume of material that undergoes cracking and hence the energy consumed in the cracking process. Whilst this is clearly worthwhile if it means a stable hydrocarbon product may be obtained, it is clearly not ideal from a cost point of view.

U.S. Pat. No. 5,069,775 discloses another alternative process wherein about 50% of a crude heavy oil recovered from a formation is directed to a reactor wherein it undergoes hydroconversion to produce a low viscosity fraction. After hydroconversion is complete, the lower viscosity product passes through two separators in sequence and the bottoms therefrom is mixed with the remaining 50% of heavy crude that bypasses the upgrading section. The resulting product is described as a flowable crude that can be pumped through a pipeline.

Like WO98/10036 the process disclosed in U.S. Pat. No. 5,069,775 does not involve an initial separation of the heavy hydrocarbon mixture into fractions as in WO2005/003258 and US2007/0108098 discussed above. The method, however, requires the hydroconverted product to undergo two separation processes which each remove hydrogen as well as lighter hydrocarbons. This is disadvantageous. It means, for example, that the lightest hydrocarbons having the lowest viscosity are not incorporated into the upgraded hydrocarbon mixture and that not all of the recovered hydrocarbon is present in the upgraded hydrocarbon mixture, i.e. it represents a reduction in process yield. The need for separation of the hydroconverted product also increases the number of steps involved in the process and introduces the need for separation equipment.

A need therefore exists for alternative processes for treating heavy hydrocarbon mixtures to improve their transportability. Simple and economically attractive processes are clearly desirable.

SUMMARY OF INVENTION

Thus viewed from a first aspect the present invention relates to a process for upgrading a heavy hydrocarbon mixture, said process comprising:
i) dividing said heavy hydrocarbon mixture into at least a first portion and a second portion, wherein said first portion comprises 10-45% wt of the heavy hydrocarbon mixture and said second portion comprises 90-55% wt of the heavy hydrocarbon mixture;
ii) thermally upgrading said first portion of heavy hydrocarbon mixture in an upgrader to produce a lighter hydrocarbon mixture; and
iii) mixing said lighter hydrocarbon mixture with a heavy hydrocarbon mixture to produce an upgraded hydrocarbon mixture,
wherein, on entry to said upgrader, the composition of said first portion of heavy hydrocarbon mixture is identical to that of said second portion of heavy hydrocarbon mixture.

Viewed from a further aspect the present invention relates to an upgraded heavy hydrocarbon mixture obtainable by a process as hereinbefore defined.

Viewed from a still further aspect the present invention relates to a method of transporting a heavy hydrocarbon mixture (e.g. to a refinery) comprising:
(a) upgrading said heavy hydrocarbon mixture by a process as hereinbefore defined to produce an upgraded heavy hydrocarbon mixture; and
(b) pumping said upgraded heavy hydrocarbon mixture (e.g. to said refinery).

Viewed from a yet further aspect the present invention relates to the use of a lighter hydrocarbon mixture to upgrade a heavy hydrocarbon mixture wherein said lighter hydrocarbon mixture is obtained by thermally upgrading a portion of said heavy hydrocarbon mixture, wherein said first portion comprises 10-45% wt of the heavy hydrocarbon mixture and said second portion comprises 90-55% wt of the heavy hydrocarbon mixture and the composition of said first portion is identical to that of said second portion when upgrading is commenced.

DETAILED DESCRIPTION OF INVENTION

The processes of the present invention are concerned with the recovery of a hydrocarbon mixture. As used herein, the term "hydrocarbon mixture" is used to refer to a combination of different hydrocarbons, i.e. to a combination of various types of molecules that contain carbon atoms and, in many cases, attached hydrogen atoms. A "hydrocarbon mixture" may comprise a large number of different molecules having a wide range of molecular weights. Generally at least 90% by weight of the hydrocarbon mixture consists of carbon and hydrogen atoms. Up to 10% by weight may be present as sulfur, nitrogen and oxygen as well as metals such as iron, nickel and vanadium (i.e. as measured sulfur, nitrogen, oxygen or metals). These are generally present in the form of impurites of the desired hydrocarbon mixture.

The processes of the present invention are particularly useful in the upgrading of heavy hydrocarbon mixtures. A heavy hydrocarbon mixture comprises a greater proportion of hydrocarbons having a higher molecular weight than a relatively lighter hydrocarbon mixture. Terms such as "light", "lighter", "heavier" etc. are to be interpreted herein relative to "heavy".

As used herein a heavy hydrocarbon mixture preferably has an API gravity of less than about 20°, preferably less than about 15°, more preferably less than 12°, still more preferably less than 10°, e.g. less than 8°. It is particularly preferred if the API gravity of the heavy hydrocarbon mixture to be upgraded by the process of the present invention is from about 5° to about 15°, more preferably from about 6° to about 12°, still more preferably about 7° to about 12°, e.g. about 7.5-9°. At such API gravities, viscosity and flowability are matters of concern.

The viscosity of a heavy hydrocarbon mixtures may be as high as 1,000,000 cP at formation temperature and pressure. Heavy hydrocarbon mixtures having these API gravities and/or viscosities tend to comprise significant amounts of aromatic and napthalenic compounds, as well as sulphur compounds, making hydrocarbon recovery particularly problematic.

Examples of heavy hydrocarbon mixtures that typically have API gravities and/or viscosities falling in the above-mentioned ranges are bitumens, tars, oil shales and oil sand deposits. Often heavy hydrocarbon mixtures are recovered at well sites located significant distances away from a refinery. For instance, the heavy hydrocarbon mixture may be recovered offshore. Preferably therefore the processes of the present invention are carried out at a well site. This means that the transportability of the hydrocarbon mixture is improved before it needs to be pumped a long distance (e.g. over hundreds or even thousands of kilometers) to a refinery. Preferred processes of the present invention further comprise the step of transporting said upgraded hydrocarbon mixture to a refinery.

The crude heavy hydrocarbon mixture that is upgraded in the processes of the present invention may be obtained using any recovery technique, particularly an enhanced oil recovery technique. A preferred process of the present invention further comprises the step of recovering a heavy hydrocarbon mixture. Representative examples of some techniques that may be used to recover heavy hydrocarbon mixture include mining, water flooding, cyclic steam injection, Steam Assisted Gravity Drainage (SAGD), as well as SAGD in combination with solvent co injection.

Prior to carrying out the first step of the process of the present invention the heavy hydrocarbon mixture recovered from a formation may be optionally cleaned. Preferably the crude heavy hydrocarbon mixture is cleaned. The crude heavy hydrocarbon mixture may, for example, undergo treatment(s) to remove water and/or solids such as sands therefrom. Water may be removed by conventional separation processes. Solids, such as sand, may be removed from a crude heavy hydrocarbon mixture by, e.g. hot water extraction, by filtration or by settling processes known in the art. The exact details of the cleaning process will depend on how the heavy hydrocarbon mixture has been recovered. The skilled man will readily be able to identify suitable cleaning techniques.

Another optional step that may be carried out prior to the first step of the process of the present invention is the addition of a solvent to the crude heavy hydrocarbon mixture. Solvent addition may be advantageous if, e.g. the crude heavy hydrocarbon mixture is unstable. Solvent addition may also be used to adjust the API of the crude heavy hydrocarbon mixture into a range in which crude hydrocarbon and water can be easily separated. Solvent may, for example, be added to adjust the API of the crude heavy hydrocarbon mixture to about 15-20°. In other processes, however, no solvent is added to the crude heavy hydrocarbon mixture prior to step (i) of the process of the present invention.

The first step of the process of the present invention is dividing the heavy hydrocarbon mixture into at least a first portion and a second portion. In some processes the mixture may be separated into three or more (e.g. 3, 4 or 5 portions). In preferred processes, however, the mixture is only separated into two portions, a first and second portion.

The division of the heavy hydrocarbon mixture into portions is preferably carried out so that the first portion is as small as possible whilst still yielding sufficient lighter hydrocarbon mixture to render the final upgraded hydrocarbon mixture transportable. It will be appreciated that the exact division will depend on the actual composition of the crude heavy hydrocarbon mixture. Generally, however, the first portion comprises 5-45% wt, more preferably 10-45% wt of the recovered heavy hydrocarbon mixture, still more preferably 15-30% wt of the recovered heavy hydrocarbon mixture, yet more preferably 20-25% wt of the recovered heavy hydrocarbon mixture.

The separation of the heavy hydrocarbon mixture into portions may be carried out by conventional methods and equipment known in the art. Thus the heavy hydrocarbon mixture recovered from a formation may all be directed into a tank (e.g. a storage tank), optionally via a cleaning and/or solvent addition process, and a portion thereof divided out (e.g. siphoned off or separate off) to form the first portion of heavy hydrocarbon mixture. The first portion is preferably directed to a processing tank. The remaining heavy hydrocarbon mixture may be retained in the storage tank or pumped to a blending tank. Preferably the remaining heavy hydrocarbon mixture is pumped to a blending tank. Alternatively the crude heavy hydrocarbon mixture, optionally via a cleaning and/or solvent addition process, may be directed straight into separate tanks, e.g. one for the first portion (e.g. a processing tank) and one for the second portion (e.g. a blending tank).

In the processes of the present invention, the composition of the first portion of heavy hydrocarbon mixture is identical to that of the composition of the second portion when it enters the upgrader, i.e. when upgrading is commenced or started. In other words, the division of heavy hydrocarbon mixture that occurs in step (i) of the process is a simple divide, separation or split of the mixture into two or more portions or volumes. Thus the heavy hydrocarbon mixture is preferably not separated into heavier and lighter fractions by, for example, distillation prior to carrying out upgrading. This is an advantage of the process of the present invention as the use of the entirety of heavy hydrocarbon to generate a lighter hydrocarbon mixture yields an upgraded hydrocarbon having a desirable hydrocarbon structure. In other words, the lighter hydrocarbon mixture produced in the process of the present invention comprises a more balanced mixture of hydrocarbons than an upgraded product produced from upgrading a lighter fraction obtained from distillation. Whilst the former still comprises a blend of hydrocarbons of a wide range of molecular weights, the latter tends to be "polarised" and comprise a high proportion of very light hydrocarbons. The significant levels of very light hydrocarbons can, in turn, cause instability problems when it is mixed with heavy hydrocarbon, e.g. precipitation of asphaltene can occur as with the use of conventional diluent.

For the same reason it is preferred if no additives, e.g. compounds, solvents, etc, are added to one portion and not to the other portion(s) prior to the upgrading process. Particularly preferably water is not solely added to the first portion of heavy hydrocarbon mixture prior to its entry to the upgrader, i.e. prior to carrying out said upgrading. Particularly preferably solid particles are not solely added to the first portion of heavy hydrocarbon mixture prior to its entry to the upgrader, i.e. prior to carrying out said upgrading. Still more preferably no additives (e.g. water, solid particles, solvent) are solely added to the first portion of heavy hydrocarbon mixture prior to its entry to the upgrader, i.e. prior to upgrading. Especially preferably the composition of the first portion of heavy hydrocarbon mixture that undergoes upgrading is identical to the crude heavy hydrocarbon mixture recovered from the formation, i.e. the crude heavy hydrocarbon mixture is simply divided but is otherwise used in its raw state. This occurs when no cleaning or no solvent addition occurs and no additives are introduced. Such processes are highly economical.

In the second step of the process of the present invention, the first portion of heavy hydrocarbon mixture is upgraded, and more particularly thermally upgraded. As used herein the term "upgrading" refers to a process wherein the hydrocarbon mixture is altered to have more desirable properties, e.g. to providing lighter, synthetic crude oils from heavier hydrocarbon mixtures by chemical processes. The average molecular weight of the hydrocarbons present in the lighter hydrocarbon mixture is lower than the average molecular weight of the hydrocarbons in the heavy hydrocarbon starting mixture. As used herein the term "thermally upgraded" refers to a hydrocarbon mixture that has been upgraded by an upgrading process wherein heat is applied. The term thermally upgraded refers to hydrocarbon mixtures prepared by, e.g. delayed coking, visbreaking, hydrocracking and hydrotreating. The term "thermally upgraded" does not encompass hydrocarbon mixtures prepared solely by solvent deasphalting.

Advantageously the step of upgrading may be carried out at the well site. This means that the heavy hydrocarbon mixture need only be transported a minimum distance. Still more preferably a minimum amount of heavy hydrocarbon mixture is upgraded. This is beneficial as the formation is often in a remote location, often offshore, with little infrastructure. Moreover, by only upgrading a minimal first portion of the heavy hydrocarbon mixture, a significant part of the heavy hydrocarbon mixture essentially remains in its crude or raw state. This means that lack of stability problems commonly encountered with blending of conventional diluents are avoided. Moreover it also means that the upgraded product is attractive to refineries as it is not significantly different in composition to the majority of hydrocarbon received from other well sites.

In processes of the invention the upgrading is carried out using a thermal process (e.g. a thermal cracking process). Optionally a solvent extraction process may additionally be used. Solvent extraction may be carried out by any conventional procedure known in the art. Preferred solvents for use in solvent extraction include butane and pentane. Whilst solvent extraction removes asphaltenes from the heavy hydrocarbon mixture, it does not convert heavy hydrocarbons to lighter hydrocarbons, i.e. no conversion takes place. In thermal processes, e.g. thermal cracking, conversion of heavy hydrocarbons to lighter hydrocarbons occurs. Any thermal process known in the art may be used.

Preferred thermal processes include delayed coking, visbreaking, hydrocracking (e.g. ebullated bed or slurry hydrocracking) and hydrotreating (e.g. distillate hydrotreating). Particularly preferably the upgrading is carried out by hydrocracking or delayed coking, especially hydrocracking.

Hydrocracking is a process wherein the heavy hydrocarbon mixture is heated in the presence of an elevated partial pressure of hydrogen. The hydrogen functions to remove double bonds from the hydrocarbons present in the mixture as well as to remove sulphur and nitrogen atoms. It is a well known process in the field of petroleum chemistry and a wide range of equipment for carrying out the process is commercially available. When hydrocracking is used as the upgrading method in the process of the invention it is typically carried out a temperature of 300-450° C., more preferably 350-420° C. The pressure used is preferably 100-200 bar, more preferably 150-180 bar. A catalyst is typically employed in the process. A typical residence time may be 0.5 to 2 hours, e.g. 1 hour to 1.5 hours.

Hydrotreating is another process wherein the heavy hydrocarbon mixture is heated in the presence of hydrogen, typically in the presence of a catalyst. Sulphur is typically removed from the hydrocarbon mixture during the process. Like hydrocracking, it is a well known process in the field of petroleum chemistry and the skilled man will readily be able to identify and obtain suitable equipment for carrying out the process. When hydrotreating is used as the upgrading method in the process of the invention it is typically carried out a temperature of 350 to 420° C., more preferably 360 to 400° C. The hydrogen pressure used is preferably 30 to 100 bar, more preferably 50 to 80 bar. A catalyst will typically be employed in the process. Preferred catalysts include nickel-molybdenum and cobalt-molybdenum. A typical residence time may be 1 to 30 minutes, e.g. 5 to 15 minutes.

Delayed coking is a process in which cracking of heavy hydrocarbon mixture occurs in one or more coke drums. In a typical process, a heavy hydrocarbon mixture is heated in a furnace and then transferred to a coke drum where it is further heated under pressure. When used for upgrading in the processes of the invention, the temperature in the coke drum(s) may be in the range 480 to 520° C. The pressure may be 3 to 5. A typical cycle time for a delayed coking process may be 12 to 24 hours. The drum effluent is typically in the vapour phase and is condensed to yield the lighter hydrocarbon mixture. The drum effluent may optionally be fractionated, but in preferred processes of the invention it is simply condensed.

Visbreaking may be carried out using a conventional soaker visbreaking process. In a typical process the first portion of heavy hydrocarbon mixture is heated, e.g. to a temperature of 400-500° C. The heated heavy hydrocarbon is then transferred to a soaker vessel. The residence time in the vessel is preferably 5 to 30 minutes.

In preferred processes of the present invention the lighter hydrocarbon mixture produced by upgrading preferably has an API gravity of at least about 10 degrees higher than that of the crude heavy hydrocarbon mixture, e.g. an API gravity of at least about 15, 20, or 25 degrees higher. In a preferred embodiment, the lighter hydrocarbon mixture has an API gravity of greater than 20 degrees, e.g. greater than 25 or 30 degrees, e.g. up to about 90 degrees. Preferred lighter hydrocarbon mixtures have an API gravity of about 20 to about 80 degrees, more preferably about 40 to about 65 degrees, still more preferably about 45 to about 60 degrees, yet more preferably about 50 to about 55 degrees. Since the API gravity of the lighter hydrocarbon mixture is maximised, less of the mixture is required for addition to heavy hydrocarbon mixture to render it transportable. The API gravity is generally higher than that of a hydrocarbon mixture obtained by full upgrading on site.

As stated above, an advantage of the process of the present invention is that a lighter hydrocarbon having a desirable hydrocarbon structure for improving the transportability of heavy hydrocarbon is obtained. The lighter hydrocarbon mixture preferably comprises a blend of hydrocarbons of a wide range of molecular weights. Particularly preferably the lighter hydrocarbon mixture comprises kerosene, light gas oil and heavy gas oil.

Particularly preferably the lighter hydrocarbon mixture produced in the process of the invention comprises a large proportion of middle distillate, e.g. at least 45% by weight of the mixture is kerosene, light gas oil and heavy gas oil. Preferably, the lighter hydrocarbon mixture comprises at least 50% by weight, especially at least 60%, 70%, 80% or 90% by weight, of middle distillate. The upper limit on the amount of middle distillate present may be, e.g. 95% by weight. The lighter hydrocarbon mixture preferably comprises at least 10% by weight of kerosene, e.g. 15 to 25% by weight. The lighter hydrocarbon mixture also preferably comprises at least 35% by weight of light gas oil, e.g. 40 to 50% by weight.

Furthermore, in some embodiments the lighter hydrocarbon mixture produced in the process of the invention preferably comprises a proportion of atmospheric residue, e.g. 1-45% by weight of the mixture is vacuum gas oil and vacuum residue. Preferably, the lighter hydrocarbon mixture comprises less than 40% by weight of atmospheric residue, e.g. 5-35% by weight. The lighter hydrocarbon mixture preferably comprises less than 15% by weight of vacuum residue, e.g. 1 to 10%, more preferably 1-5% by weight.

By "kerosene" is meant a hydrocarbon fraction having a boiling point between about 180° C. and 240° C.; by "light gas oil" is meant a hydrocarbon fraction having a boiling point between about 240° C. and 320° C.; and by "heavy gas oil" is meant a hydrocarbon fraction having a boiling point between 320° C. and 375° C. By "vacuum gas oil" is meant a hydrocarbon fraction having a boiling point between about 375° C. and 525° C.; and by "vacuum residue" is meant a hydrocarbon fraction having a boiling point of greater than about 525° C.

A further advantage of the upgrading process used in the present invention is that the lighter hydrocarbon mixture has a lower level of contaminants than the crude heavy hydrocarbon mixture. Accordingly the lighter hydrocarbon mixture produced by upgrading preferably has a sulphur content of less than 50% of that of the crude heavy hydrocarbon mixture. For example, the lighter hydrocarbon mixture may comprise less than 3%, preferably less than 2% and especially preferably less than 1% by weight of sulphur. Further preferred lighter hydrocarbon mixtures preferably have an aromatic (e.g. asphaltene and/or naphthenic) content of less than that of the crude heavy hydrocarbon mixture, more preferably at least 10% less than that of the crude heavy hydrocarbon mixture, still more preferably at least 20% less than that of the crude heavy hydrocarbon mixture. For example, the lighter hydrocarbon mixture may comprise less than 3%, preferably less than 2% and especially preferably less than 1% by weight of asphaltene and/or naphthenic content. Preferably the lighter hydrocarbon mixture is substantially free of asphaltene and/or naphthenic residues.

In the third step of the process of the present invention, the lighter hydrocarbon mixture obtained by upgrading is mixed with heavy hydrocarbon mixture. The heavy hydrocarbon mixture may be any hydrocarbon mixture recovered from a formation. Preferably, however, the heavy hydrocarbon mixture is recovered from the same formation from which the heavy hydrocarbon mixture used to make the lighter hydrocarbon mixture is obtained.

More preferably the heavy hydrocarbon mixture comprises the second portion produced in the first step of the process. The heavy hydrocarbon mixture may comprise all of the second portion as well as additional heavy hydrocarbon. Alternatively the heavy hydrocarbon mixture may comprise only a part of the second portion. Still more preferably, however, the lighter hydrocarbon mixture is mixed solely with all of said second portion of heavy hydrocarbon mixture. Thus in a preferred process a minimum amount of heavy hydrocarbon mixture is upgraded to enable the entirety of recovered heavy hydrocarbon to be made transportable. The overall structure of the upgraded heavy hydrocarbon is therefore well balanced, i.e. it comprises a mixture of hydrocarbons across the entire molecular weight range and does not contain a significantly higher proportion of lighter and/or heavier components. As a result, the upgraded heavy hydrocarbon is stable.

In processes of the present invention, the first portion comprises 5-45% wt of heavy hydrocarbon mixture, more preferably 10-45% wt of the recovered heavy hydrocarbon mixture, still more preferably 15-30% wt of the recovered heavy hydrocarbon mixture, yet more preferably 20-25% wt of the recovered heavy hydrocarbon mixture. Correspondingly the second portion comprises 95-55% wt of hydrocarbon mixture, more preferably 90-55% wt of the recovered heavy hydrocarbon mixture, still more preferably 85-70% wt of the recovered heavy hydrocarbon mixture, yet more preferably 80-75% wt of the recovered heavy hydrocarbon mixture. In a particularly preferred process of the invention, the total % wt of the first portion and the second portion is at least 90% wt, more preferably at least 95% wt, still more preferably 100% wt. This represents a highly desirable process wherein a non-transportable heavy hydrocarbon mixture is completely converted to an upgraded hydrocarbon mixture without loss of hydrocarbon or the addition of external hydrocarbon.

Prior to mixing the lighter hydrocarbon mixture with the heavy hydrocarbon mixture, the lighter hydrocarbon mixture may optionally be hydrotreated. Hydrotreatment may, for example, be carried out by catalytic hydrogenation processes known in the art. Advantageously this process reduces the amount of destabilising unsaturated hydrocarbons present in the lighter hydrocarbon mixture. Additionally any sulphur and/or nitrogen present in the lighter hydrocarbon mixture may also be removed.

In preferred processes of the present invention, however, the lighter hydrocarbon mixture obtained from upgrading is mixed directly with said heavy hydrocarbon mixture. Thus the lighter hydrocarbon mixture preferably does not undergo any separation and/or purification steps following upgrading. Particularly preferably the lighter hydrocarbon mixture obtained from upgrading does not undergo separation prior to mixing with the heavy hydrocarbon mixture. This minimises losses inherent in additional processing and transportation steps. As a result a maximum yield of lighter hydrocarbon mixture for mixing with heavy hydrocarbon mixture is obtained from a minimum amount of heavy hydrocarbon mixture.

The mixing of the lighter hydrocarbon mixture and the heavy hydrocarbon mixture may be carried out using conventional equipment. The mixing or blending may, for example, be achieved by stirring or agitation in a vessel, using jet mixers or mixer nozzles, line mixing or pump mixing. Preferably the mixing step yields a homogenous product.

During mixing, or alternatively, after mixing is complete, an external diluent may optionally be added to the hydrocarbon mixture. As used herein the term "external diluent" is used to refer to a diluent that is not generated from the same heavy hydrocarbon mixture that is being made transportable. External diluents are those used conventionally in the art. Representative examples include napthha, light crude oil and condensates. Preferred external diluents have an API of 20-80°. Preferably, however, no external diluent is added to the hydrocarbon mixture during mixing. Still more preferably no external diluent is added to the upgraded hydrocarbon mixture after mixing.

The upgraded hydrocarbon mixture produced in step (iii) is preferably transportable. More preferably the upgraded hydrocarbon mixture is pumpable, e.g. it has a sufficiently low density and viscosity (e.g. at ambient conditions) to flow along a pipeline. The upgraded hydrocarbon mixture is especially preferably a hydrocarbon mixture which requires little, e.g. essentially no, additional solvent to be added in order to render the mixture pumpable. Preferably the upgraded hydrocarbon mixture does not require the addition of any diluent to render the mixture pumpable, e.g. with conventional equipment.

The upgraded hydrocarbon mixture produced by the process of the invention preferably has an API gravity of at least about 5 degrees higher than that of the crude heavy hydrocarbon mixture, e.g. an API gravity of at least about 8, 12, 15 or 18 degrees higher. In a preferred embodiment, the upgraded hydrocarbon mixture has an API gravity of greater than 20 degrees, e.g. greater than 25 or 30 degrees, e.g. up to about 35 degrees. Preferred upgraded hydrocarbon products have an API gravity of about 15-30 degrees, more preferably about 20-25 degrees.

In preferred processes of the present invention the hydrocarbon mixture produced by the process of the invention preferably has a viscosity of less than 500 cST at 7° C., more preferably less than 400 cST at 7° C., still more preferably less than 350 cST at 7° C. Preferably the viscosity of the upgraded hydrocarbon mixture is in the range 100-500 cST at 7° C., more preferably 200-400 cST at 7° C., e.g. about 300-350 cST at 7° C.

Particularly preferably the upgraded hydrocarbon mixture produced in the process of the invention comprises a significant proportion of middle distillate, e.g. at least 10% by weight of the mixture is kerosene, light gas oil and heavy gas oil. Preferably, the upgraded hydrocarbon mixture comprises 15-30% by weight, more preferably 20-30% by weight, of middle distillate. The upgraded hydrocarbon mixture preferably comprises at least 5% by weight of kerosene, e.g. at least 7% or at least 10% by weight. There is no upper limit on the amount of kerosene present but it might be about 30% by weight. The upgraded hydrocarbon mixture also preferably comprises at least 5% by weight of light gas oil, e.g. at least 10% or 15% by weight. The upper limit on the amount of light gas oil present may be 30% by weight.

Furthermore, the upgraded hydrocarbon mixture produced in the process of the invention preferably comprises a significant proportion of atmospheric residue, e.g. 30-80% by weight, more preferably 40-70% by weight, still more preferably 50-60% by weight of the mixture is vacuum gas oil and vacuum residue. Preferably, the upgraded hydrocarbon mixture comprises at least 20% by weight, especially at least 30% by weight, of atmospheric residue. The upper limit on the amount of atmospheric residue may be, e.g. 50% by weight. The upgraded hydrocarbon mixture preferably comprises at least 10% by weight of vacuum residue, e.g. at least 10% or 15% by weight. The upper limit on the amount of vacuum residue may be, e.g. 50% by weight.

It has also been surprisingly found that the process of the invention typically yields an upgraded hydrocarbon mixture with significantly reduced catalyst poisoning components, thereby making it more suitable for catalytic upgrading, e.g. at a refinery. Further advantages of the processes invention include the production of an upgraded hydrocarbon mixture which is less contaminated with solvent residues and which is stable. The fact that the majority of the hydrocarbon mixture remains in its crude or raw state is believed to be one of the reasons these benefits are obtained.

A further advantage of the process of the invention is that the upgraded hydrocarbon has a lower level of contaminants than the crude heavy hydrocarbon mixture. Accordingly the upgraded hydrocarbon product of the invention preferably has a sulphur content of less than 20% of that of the crude heavy hydrocarbon mixture. For example, the upgraded hydrocarbon product of the invention may comprise less than 5%, preferably less than 3% and especially preferably less than 2.5% by weight of sulphur. In a further embodiment, the upgraded hydrocarbon product of the invention preferably has an aromatics (e.g. asphaltene and/or naphthenic) content of less than that of the crude heavy hydrocarbon mixture, more preferably at least 50% less than that of the crude heavy hydrocarbon mixture, still more preferably at least 60% less than that of the crude heavy hydrocarbon mixture. Preferably the aromatics (e.g. asphaltene and/or naphthenic) content of the upgraded hydrocarbon product is 1-15% wt, more preferably 5-10% wt.

In a further aspect therefore, the invention provides an upgraded hydrocarbon mixture, such as a pumpable hydrocarbon mixture, obtainable (e.g. obtained by) by a process as defined herein. In particular, the upgraded hydrocarbon mixture of the invention is characterised by a significantly lower viscosity and a lighter colour (e.g. light brown to yellow in colour) than that of the crude heavy hydrocarbon mixture.

The upgraded hydrocarbon mixture of the invention preferably has the characteristics described above. The upgraded hydrocarbon product of the invention preferably has an improved (i.e. reduced) carbon/hydrogen ratio, e.g. as shown by an increased proportion of saturated hydrocarbons relative to aromatic hydrocarbons and in particular to the heteroatom-containing (e.g. N, O or S containing) fraction of the product.

The invention will now be described with reference to the following non-limiting examples and Figures wherein:

FIG. 1 shows a simple block diagram of a preferred process of the present invention.

Referring to FIG. 1 a feed 1 of heavy hydrocarbon mixture recovered from a formation arrives at the plant and is cleaned in cleaning tank 2. This may involve removing sand and/or water from the crude feed of heavy hydrocarbon mixture. Following cleaning, the cleaned mixture is fed to a tank 3 where the heavy hydrocarbon mixture is divided into a first portion and a second portion. A first portion of heavy hydrocarbon mixture is divided off through line 4 and is fed into an upgrader 5. The upgrader may, for example, be a vessel suitable for carrying out hydrocracking or hydrogenation. Optionally a heat exchanger (not shown) may be included in line 4 to pre heat the first portion prior to upgrading in upgrader 5. The upgraded hydrocarbon produced in upgrader 5 is fed through line 6 to mixing tank 7. The upgraded hydrocarbon is mixed directly, e.g. without undergoing a separation, with a second portion of heavy hydrocarbon mixture, which is fed from tank 3, through line 8 to mixing tank 7. In mixing tank 7 the lighter hydrocarbon mixture and the heavy hydrocarbon mixture are mixed to produce an upgraded hydrocarbon mixture that is a transportable product.

Typical characteristics of the hydrocarbon mixture at different stages of the process are shown in the Table below.

| | Recovered heavy hydrocarbon mixture | Lighter hydrocarbon mixture | Second portion of heavy hydrocarbon mixture | Upgraded hydrocarbon mixture |
|---|---|---|---|---|
| Volume (%) | 100 | 35 | 65 | 100 |
| API (degrees) | 8 | 45 | 8 | 20 |
| Viscosity (cST at 7° C.) | | | | 350 |
| Sulphur (% wt) | <5% wt | <0.1% wt | <5% wt | <3 wt % |
| C5 - Asphaltenes (% wt) | 10-20 wt % | 0.0 wt % | 10-20 wt % | 5-10 wt % |

-continued

|  | Recovered heavy hydrocarbon mixture | Lighter hydrocarbon mixture | Second portion of heavy hydrocarbon mixture | Upgraded hydrocarbon mixture |
|---|---|---|---|---|
| Metals [Ni & V] (ppm) | 100-500 | 0 | 100-500 | 50-250 |

API degrees is measured according ASTM D287
Sulfur content is determined according to ASTM D7679
Asphaltene content is determined according to ASTM D3279
Metals content is determined according to ASTM D5863

The advantages of this process compared to the use of conventional diluent include:
- Avoiding the need to transport diluent to the wellsite and back again from the refinery where it is separated from the hydrocarbon mixture
- Avoiding any issues of lack of compatibility, e.g. the occurrence of precipitation of asphaltenes from the hydrocarbon mixture upon addition of the diluent.
- Stability of the upgraded hydrocarbon mixture enables it to be transported under a range of conditions, e.g. varying pipeline temperatures and pressures
- Significantly improved upgraded hydrocarbon mixture quality. In fact the upgraded hydrocarbon mixture obtained from processes of the present invention may require less intense processing at the refinery and thus be of higher value The advantages of this process compared to a process wherein the entirety of heavy oil is upgraded on site include:
- A much smaller amount of fuel and/or hydrogen needs to be transported to the well site to facilitate the upgrading process
- A higher yield of upgraded oil is obtained
- Benefits of economy of scale obtained by upgrading the majority of the heavy hydrocarbon at a refinery

The invention claimed is:

1. A process for upgrading a heavy hydrocarbon mixture, said process comprising:
   i) dividing said heavy hydrocarbon mixture into at least a first portion and a second portion, wherein said first portion comprises 10-45% wt of the heavy hydrocarbon mixture and said second portion comprises 90-55% wt of the heavy hydrocarbon mixture;
   ii) thermally upgrading said first portion of heavy hydrocarbon mixture in an upgrader to produce a lighter hydrocarbon mixture, wherein said upgrading is carried out using a thermal process selected from the group consisting of delayed coking, hydrocracking and hydrotreating, and wherein said first portion of heavy hydrocarbon mixture is not separated into heavier and lighter fractions prior to carrying out said upgrading; and
   iii) directly mixing said lighter hydrocarbon mixture obtained from upgrading with said second portion of heavy hydrocarbon mixture to produce an upgraded hydrocarbon mixture, wherein said lighter hydrocarbon mixture obtained from upgrading does not undergo separation following upgrading and prior to mixing with said second portion of heavy hydrocarbon mixture,
   wherein, on entry to said upgrader, the composition of said first portion of heavy hydrocarbon mixture is identical to that of said second portion of heavy hydrocarbon mixture.

2. A process as claimed in claim 1, wherein said first portion comprises 15-30% wt of the heavy hydrocarbon mixture.

3. A process as claimed in claim 1, wherein said second portion comprises 85-70% wt of the heavy hydrocarbon mixture.

4. A process as claimed in claim 1, wherein said upgrading is carried out by hydrocracking or delayed coking.

5. A process as claimed in claim 1, wherein said lighter hydrocarbon mixture has an API of at least 35 degrees.

6. A process as claimed in claim 5, wherein said lighter hydrocarbon mixture has an API of 40-65 degrees.

7. A process as claimed in claim 1, wherein said lighter hydrocarbon mixture comprises at least 45% wt of middle distillate comprising kerosene, light gas oil and heavy gas oil.

8. A process as claimed in claim 1, wherein said heavy hydrocarbon mixture has an API of less than 20 degrees.

9. A process as claimed in claim 8, wherein said heavy hydrocarbon mixture has an API of 5-15 degrees.

10. A process as claimed in claim 1, wherein said upgraded hydrocarbon mixture produced in step (iii) is transportable.

11. A process as claimed in claim 1, wherein said upgraded hydrocarbon mixture produced in step (iii) has an API in the range 15-30 degrees.

12. A process as claimed in claim 1, wherein said process is carried out at a well site.

13. A process as claimed in claim 1, further comprising the step of transporting said upgraded hydrocarbon mixture to a refinery.

14. A method of transporting a heavy hydrocarbon mixture comprising:
   (a) upgrading said heavy hydrocarbon mixture by a process as claimed in claim 1 to produce an upgraded heavy hydrocarbon mixture; and
   (b) pumping said upgraded heavy hydrocarbon mixture.

* * * * *